(12) United States Patent
Bock et al.

(10) Patent No.: US 7,277,173 B1
(45) Date of Patent: Oct. 2, 2007

(54) ACTIVE OPTICAL ALIGNMENT USING MEMS MIRRORS

(75) Inventors: Timothy Paul Bock, Greenwich Township, Berks County, PA (US); John William Osenbach, Kutztown, PA (US); Rory Keene Schlenker, Greenwich Township, Berks County, PA (US)

(73) Assignees: Agere Systems Inc., Allentown, PA (US); Lucent Technologies, Inc., Murray Hill, NJ (US)

( * ) Notice: Subject to any disclaimer, the term of this patent is extended or adjusted under 35 U.S.C. 154(b) by 137 days.

(21) Appl. No.: 10/736,935

(22) Filed: Dec. 16, 2003

Related U.S. Application Data

(60) Provisional application No. 60/436,434, filed on Dec. 24, 2002.

(51) Int. Cl.
*G01B 11/00* (2006.01)
(52) U.S. Cl. ..................................................... 356/399
(58) Field of Classification Search ................ 356/399, 356/614, 138, 124, 128, 139.1, 445; 385/18
See application file for complete search history.

(56) References Cited

U.S. PATENT DOCUMENTS

| 5,661,591 | A | 8/1997 | Lin et al. | |
|---|---|---|---|---|
| 5,774,604 | A | 6/1998 | McDonald | |
| 5,960,133 | A * | 9/1999 | Tomlinson | 385/18 |
| 5,995,688 | A | 11/1999 | Aksyuk et al. | |
| 6,532,115 | B2 * | 3/2003 | Holmes | 359/722 |
| 6,539,142 | B2 * | 3/2003 | Lemoff et al. | 385/18 |
| 6,646,727 | B2 * | 11/2003 | Saleh et al. | 356/73.1 |
| 6,760,505 | B1 * | 7/2004 | Street et al. | 385/18 |
| 6,775,047 | B1 * | 8/2004 | Leung et al. | 359/290 |
| 6,788,416 | B2 * | 9/2004 | Reuter | 356/445 |
| 6,831,750 | B2 * | 12/2004 | Mehrl et al. | 356/614 |
| 7,095,494 | B2 * | 8/2006 | Mehrl et al. | 356/124 |

* cited by examiner

*Primary Examiner*—Tarifur Chowdhury
*Assistant Examiner*—Isiaka O Akanbi

(57) ABSTRACT

An optical package includes one or more MEMS mirrors to provide alignment between internal optical components and the signal port(s) on the package (where one or more ports may include optical fiber attachments). Once the components are placed in the package, an electrical signal is used to adjust the deflection profile of the appropriately positioned MEMS mirror(s) until maximum coupling between the internal components and the fibers/ports is obtained. Advantageously, if later signal degradation occurs due to, for example, subsequent physical misalignment of the internal components, corrective electrical signal can be sent to the MEMS mirror(s) to provide correction and re-alignment without having to open the package and physically move the components.

6 Claims, 3 Drawing Sheets

ACTIVE OPTICAL ALIGNMENT USING MEMS MIRRORS

CROSS-REFERENCE TO RELATED APPLICATION

The present application claims the benefit of Application Ser. No. 60/436,434, filed Dec. 24, 2002.

BACKGROUND OF THE INVENTION

One of the major advances in recent years has been the increased use of optical communication systems for carrying very large quantities of information with low distortion and at a relatively low cost over great distances. Optical systems are also promising for such purposes as computing because of the inherently high speeds at which they can be operated. For these reasons, considerable development work ha been done in making various photonics packages for use in such systems. Photonics generally refers to devices that share both electronic and optical attributes, such as lasers, which generate coherent light in response to an electrical signal, and photodetectors, which generate an electrical signal in response to light.

A fundamental problem in making a photonics package such as a laser source module is the alignment of a device such as a laser source module with an optical waveguide. Conventional packages for photonics arrangements are typically made out of variety of dissimilar materials, such as metal, glass and ceramic, and involve relatively complicated manipulation of components during assembly. That is, the assembly process involves moving the components in three dimensions in order to place the components in the desired locations; for example, alignment of a device to a substrate, alignment of a fiber to a ferrule, alignment of a ferrule to a package and, finally, alignment of the package to the device. These alignment steps depend upon fairly specialized, expensive equipment. Thus, it would be desirable to find an alternative mechanism for performing one or more of these alignment procedures.

SUMMARY OF THE INVENTION

The need remaining in the prior art is addressed by the present invention, which relates to optical alignment arrangements and, more particularly, to the use of microelectromechanical system (MEMS) mirror elements to provide optical alignment between components in an optical communication system.

In accordance with the present invention, one or more MEMS mirrors is disposed in an optical package and positioned to reflect optical signals between an active optical device (e.g., one or more sources/detectors) located in the package and a passive receiver of light (e.g., transmission fiber, optical waveguide) located at a communication port on a package wall. In operation, the active optical device is turned on and the optical coupling between the active device and the passive device is measured. The deflection profile of the MEMS mirror(s) is then adjusted, using an electrical input signal, until maximum coupling is achieved. The use of a MEMS mirror to "fine tune" the coupling between the active and passive devices thus eliminates the need to perform the rigorous mechanical alignment (such as using an x-y alignment table) so prevalent in the prior art.

In one embodiment of the present invention, the electrical activation of the MEMS mirror(s) is performed until maximum coupling is obtained, and the positioning of the MEMS mirror is not further adjusted until misalignment is recognized. In an alternative embodiment, an alignment control feedback loop is contained within the package, where the alignment between the active and passive components is continuously monitored and the deflection profile of the MEMS mirror(s) is changed as needed.

Other and further embodiments and advantages of the present invention will become apparent during the course of the following discussion and by reference to the accompanying drawings.

BRIEF DESCRIPTION OF THE DRAWINGS

Referring now to the drawings.

DETAILED DESCRIPTION

The present invention will best be understood from the detailed description given below, as well as from the accompanying drawings of the embodiments of the present invention which, however, should not be taken to limit the invention to specific embodiments, but rather are for explanation and understanding only.

Figure 1:
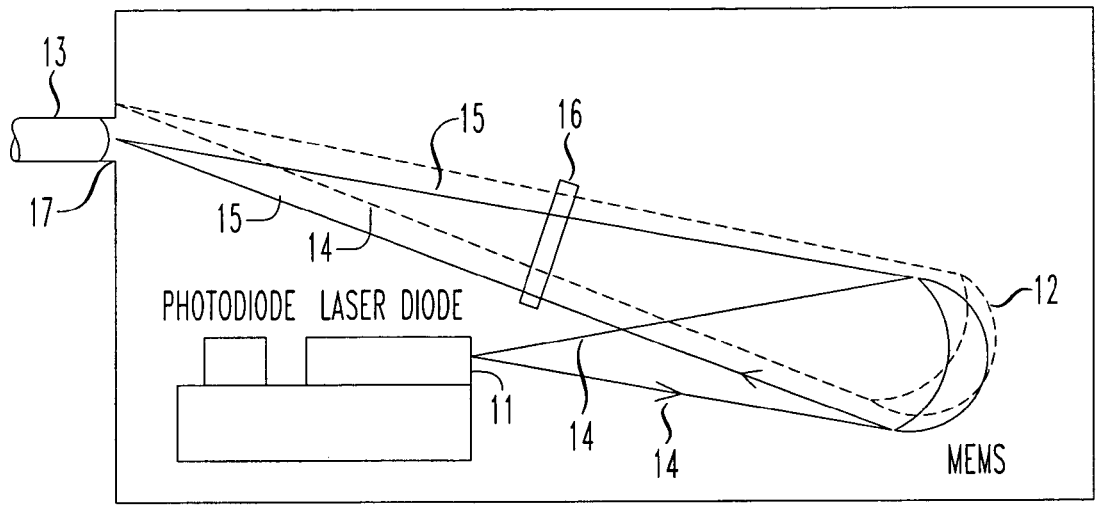
FIG. 1 is a block diagram of an embodiment of the present invention.

Referring to FIG. 1, there is shown one embodiment of the invention. In particular, FIG. 1 shows a basic package embodiment of the invention that couples light from a light source to an optical fiber output (or another passive output device, such as an optical waveguide) that is attached to an outside wall of the package. As shown, package 10 includes a laser diode light source 11, a MEMS mirror 12 and a fiber 13. Laser diode 11 generates a conical-shaped beam of light 14 which propagates toward MEMS mirror 12. As mentioned above and will be discussed in detail below, the deflection profile of MEMS mirror 12 is electrically adjusted (through a well-known process) to steer and control the alignment of the beam through a lens system 16 and into fiber 13. In particular, after MEMS mirror 12 redirects the light beam as beam 15, lens system 16 focuses light beam 15 toward fiber 13. In accordance with the present invention, MEMS mirror 12 is activated with an electrical signal to modify its deflection profile so as to redirect beam 15 into the core region of fiber 13. It will be understood by those skilled in the art that other components can be substituted for fiber 13. For example, a light detector (such as a photodiode), a mirror, or an optical receiver could be attached at the exit port of package 10 in place of fiber 13. Package 10 is assembled with the shown components inside the package, then fiber 13 is attached and the package is sealed. Before package 10 is sealed, the alignment of the components inside the package is tested by adjusting MEMS mirror 12 (using an applied electrical signal to change its deflection profile) so that the optical power reaching fiber 13 is at the desired level. After the package is sealed, the light input to fiber 13 can continue to be measured, and further electrical adjustment signals applied to MEMS mirror 12 to provide alignment, since the process of sealing the package may introduce misalignment into the system. Shown in phantom (and exaggerated for the purposes of illustration) is a misalignment between beam 15 and fiber 13, illustrating an initial misalignment when the components are first placed in package 10 and fiber 13 is attached to output port 17 of package 10. Unlike prior art arrangements, it is not necessary to precisely align fiber 13 with port 17, since the deflection profile of MEMS mirror 12, as controlled by an electrical input signal, is changed to steer the path of beam 15 until alignment is achieved.

This package has several advantages over the prior art, due to its use of a MEMS mirror. First, it allows for reduced placement tolerance and placement accuracy of the components inside the package. "Accuracy" is defined as the mean placement position relative to the design placement position. "Tolerance" is the variation in placement position relative to the mean. Second, it allows for monitoring and post-assembly alignment adjustment between the active (e.g., laser) and passive (e.g., fiber) components. That is, the strength of the transmission of light from laser diode 11 to fiber 13 through MEMS mirror 12 can be monitored by measuring the optical output power at fiber 13. If the output power increases or decreases beyond a specified range, the output power can be brought back into the specified range by improving the re-alignment of laser diode 11 with fiber 13. The improvement in re-alignment is achieved by using an electrical signal to modify the deflection profile of MEMS mirror 12. The ability to adjust MEMS mirror 12 thus reduces the variance of coupled optical output power. In particular, if the elements inside of the package go out of alignment after assembly, adjustment of the MEMS mirror can be used to compensate for the misalignment.

Figure 2:
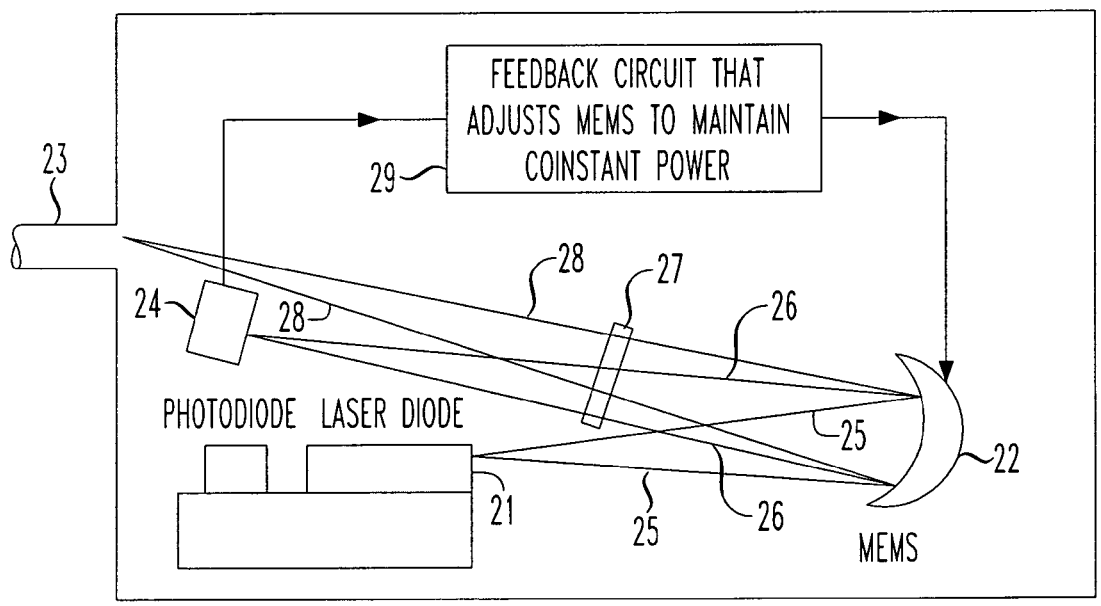
FIG. 2 is a block diagram of a second embodiment of the present invention.

Referring to FIG. 2, there is shown another embodiment of the present invention, this embodiment including a feedback loop within the package to continuously monitor and realign the active optical device(s) with the associated optical fiber (or other passive device). As shown, package 20 includes a laser diode light source 21, a MEMS mirror 22, a fiber 23, and a monitoring photodiode 24. The output of photodiode 24 is connected by any means known to those skilled in the art to both MEMS mirror 22 and laser diode 21 so that photodiode 24 will provide feedback signals to both devices.

In operation, laser diode 21 emits light beam 25 toward MEMS mirror 22, which divides the light into two new beams 26, 28 of a predetermined power ratio, where the majority of the signal power will be within beam 28, directed to the system and, and a minimal amount of power remaining in beam 26 directed to the feedback photodiode. Emitted beam 25 can be divided into two beams by incorporating a slit into MEMS mirror 22, or by using any other means that is well-known to those skilled in the art. Each new beam of light 26, 28 is focused by a lens system 27 similar to lens system 15 of FIG. 1. It will be understood that similar lens systems are used with all of the embodiments of the present invention. Referring back to FIG. 2, beam 28 is directed to fiber 23 (or any other suitable passive optical device). Beam 26 is directed to photodiode 24, which is located at any convenient position inside package 20. For example, photodiode 24 can be located on a shelf above laser diode 21. As an alternative to using a split MEMS mirror, a pair of co-located MEMS mirrors may be used, with one having its reflection directed toward fiber 23 and the other having its reflection directed toward monitoring photodiode 24.

In accordance with the present invention, by receiving a portion of the laser output beam, monitoring photodiode 24 is able to sense changes in the laser diode's output power and will, for example, sense the decrease in output power from laser diode 21 over time (causing the output beam to shift slightly and lose alignment). In accordance with the present invention, monitoring photodiode 24 will receive maximum power when laser diode 21, lens system 27 and fiber 23 are properly aligned. As misalignments develop, the received power will drop. Feedback circuit 29, responding to the output from monitoring photodiode 24, recognizes the drop in power and provides a control signal input to MEMS mirror 22, which will change the deflection profile of MEMS mirror 22 and steer both beams 26 and 28 until maximum power is restored.

Figure 3:
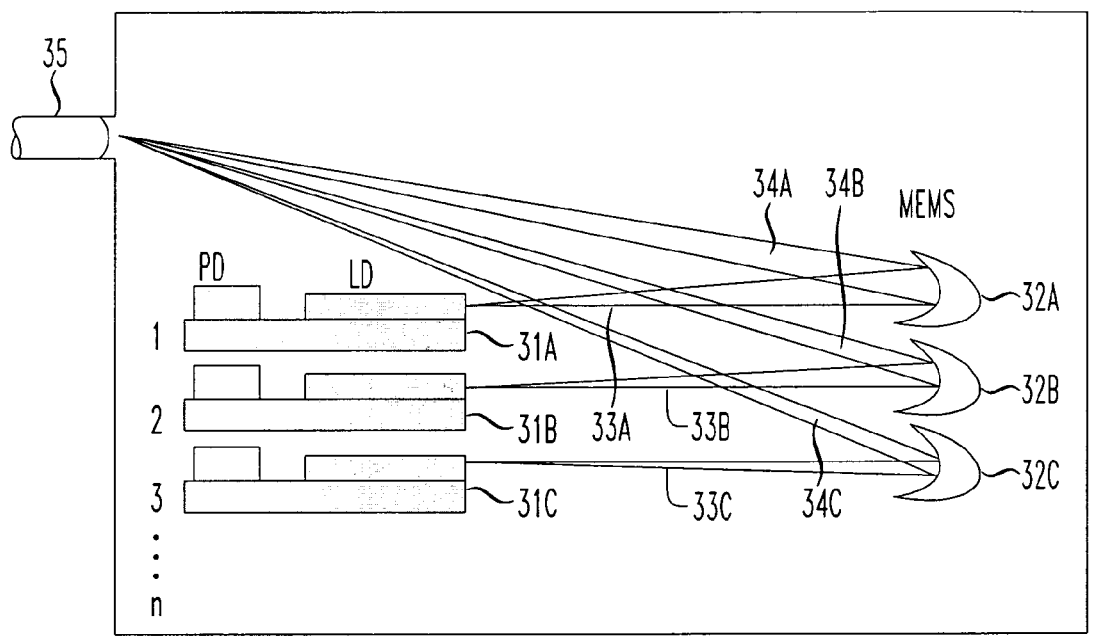
FIG. 3 is a block diagram showing a top view of a third embodiment of the present invention.

Referring to FIG. 3, there is shown another embodiment of the present invention. FIG. 3 illustrates an optical package that is used to couple light from multiple light sources into a single optical fiber output (or other passive output device). This embodiment is particularly well-suited for high power applications. As is well-known in the art, solid state lasers have limited output power. At the present time, their output power is limited by design characteristics to a value of approximately 300 mW. However, much higher power levels are needed for a number of newer applications. Using the embodiment of FIG. 3, the output power of multiple laser diodes can be cascaded to obtain a single, high power, output signal.

In particular, FIG. 3 contains a top view of an exemplary high power transmitter package 30. In this embodiment, a set of three laser diodes, denoted 31A, 31B and 31C are shown, and for this particular case each emits light at essentially the same wavelength. In general, any desired number N of such lasers may be included in a high power transmitter package. Package 30 includes a number of MEMS mirrors equal to the number of lasers in the package, shown in this example as MEMS mirrors 32A, 32B and 32C. Attached to package 30 is a fiber 35 which, as before, can be replaced by any suitable passive optical device or arrangement. In operation, laser diodes 31A, 31B and 31C generate optical beams 33A, 33B and 33C, respectively, where these beams then propagate toward MEMS mirrors 32A, 32B and 32C, respectively. As shown, MEMS mirrors 32A, 32B and 32C are adjusted to direct light beams 33A, 33B and 33C toward fiber 35 as light beams 34A, 34B and 34C, respectively. Before package 30 is sealed, MEMS mirrors 32A, 32B and 32C are individually adjusted, in accordance with the teachings of the present invention, so that maximum light power is received at fiber 35. In accordance with the present invention, should any misalignment then occur between an exemplary laser diode 31$i$ and fiber 35, the associated MEMS mirror 32$i$ can be further adjusted to bring the pair of devices back into alignment.

Using the embodiment of the present invention as shown in FIG. 3 provides a high power optical transmitter without the need to rely only a single laser source. That is, this embodiment allows for the coupling of multiple light sources into a single output signal path to create a high power optical device which has the potential to create power in excess of 1 W. In addition to the advantages identified with other embodiments of this invention, another advantage of this embodiment is that it allows for the use of lower power, lower cost laser diodes. Another advantage of the embodiment of FIG. 3 is that a selection process may be used to preferentially "add" or "drop" various laser diode sources from use. For example, laser diode 31A can be selected to be the only laser sending a light beam toward fiber 35 through its associated MEMS mirror 32A. Alternatively, laser diode 31B can be selected to be the only laser diode sending a light beam toward fiber 35 through its MEMS mirror 32B. In another embodiment, laser diodes 31B and 31C can be cascaded (other cascaded arrangements may be used). Moreover, another advantage of the embodiment shown in FIG. 3 is that different laser diodes operating at different wavelengths can be utilized to provide WDM (wavelength division multiplexed) transmission into fiber 35.

Figure 4:
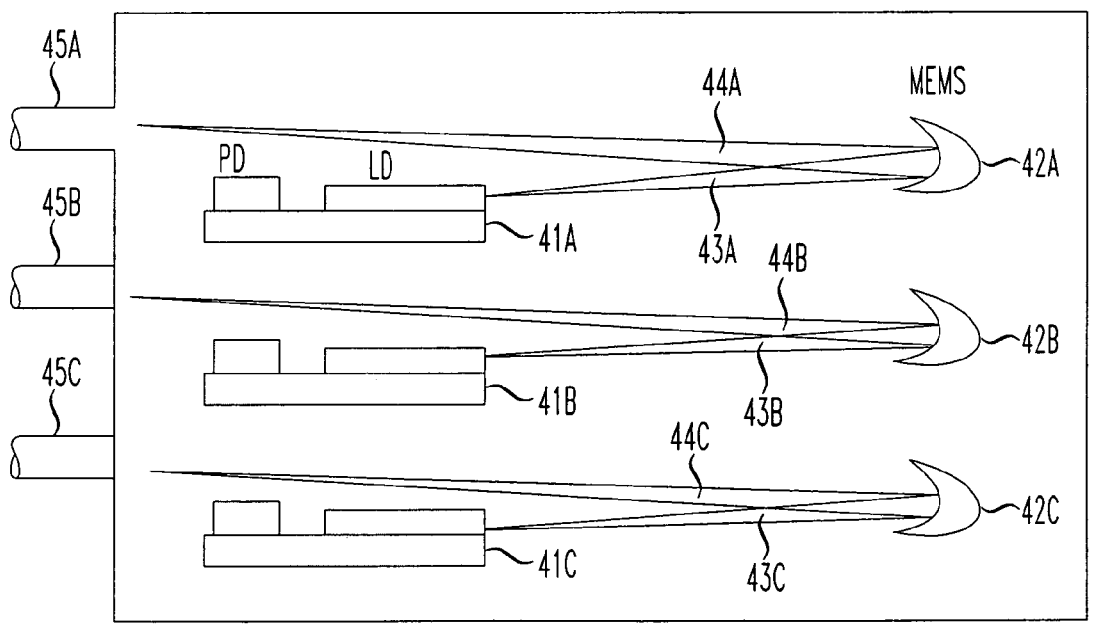
FIG. 4 is a block diagram showing a top view of a fourth embodiment of the present invention.

Referring to FIG. 4, there is shown another embodiment of the present invention. In particular, FIG. 4 illustrates an arrangement that couples light from multiple light sources to multiple optical fibers (or other optical outputs). As shown, package 40 includes multiple laser diodes 41A, 41B, 41C (where, as before, any desired number of laser diodes can be used). Package 40 also includes multiple MEMS mirrors 42A, 42B, 42C, where the number of MEMS mirrors is equal to the number of laser diodes. Attached to package 40 are multiple fibers 45A, 45B and 45C, which could also comprise any sort of passive light receiver. Laser diodes 41A, 41B and 41C generate optical beams 43A, 43B and 43C, respectively, which then propagate toward MEMS mirrors 42A, 42B and 42C. In accordance with the present invention, each MEMS mirror is separately adjustable (using an electrical input signal to control the deflection profile of the device) to direct the output beams 44A, 44B, 44C toward their respective fibers 45A, 45B and 45C.

As an advantage of this embodiment is that it uses MEMS mirrors to couple multiple light sources to multiple or single fibers in an optoelectronics package. It allows for isolation and independent control of multiple devices requiring different wavelengths and/or different output power levels. It allows multiple signals (perhaps all the same wavelength) to be sent over multiple fibers. Another advantage of this embodiment is that it allows multiple wavelengths to be transmitted over multiple fibers. For example, laser diode 41A can be set to emit light at a first wavelength $\lambda_1$, laser diode 41B can be set to emit light at a second wavelength $\lambda_2$, and laser diode 41C can be set to emit light at a third wavelength $\lambda_3$.

Figure 5:
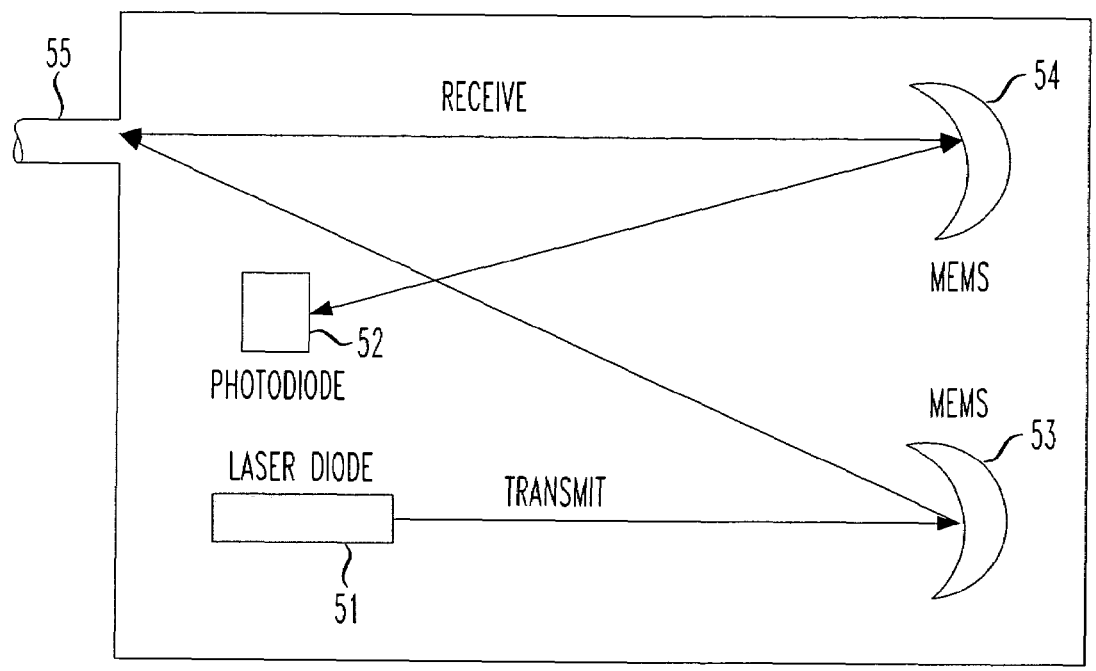
FIG. 5 is a block diagram of a transceiver embodiment of the present invention.

Referring to FIG. 5, there is shown an embodiment of a single fiber transceiver, that is, a system that can both transmit and receive optical signals simultaneously over a single fiber. The transmit function and the receive function can be performed simultaneously when a first wavelength is used for transmission and a second, different wavelength is used for reception. FIG. 5 is a package embodiment 50 of the invention that couples light from a single laser diode 51 to a single optical fiber output 55. Simultaneously, an input light signal propagating along fiber 55 is applied as an input to photodiode 52 (or any other suitable optical receiving device). In this embodiment, the single fiber 55 serves as both an output receiver and an input transmitter. Package 50, as shown, also includes MEMS mirrors 53 and 54, where MEMS mirror 54 is used to adjust the alignment between optical fiber 55 and photodiode 52, and MEMS mirror 53 is used to adjust the alignment between laser diode 51 and optical fiber 55. By "decoupling" the alignment between the source (laser) and detector (photodiode) with respect to the communication fiber 55 shared by both devices, in accordance with the present invention, the alignment between each device and fiber 55 may be individually controlled and corrected without having to adjust the position of fiber 55 (which would impact all other alignments).

Figure 6:
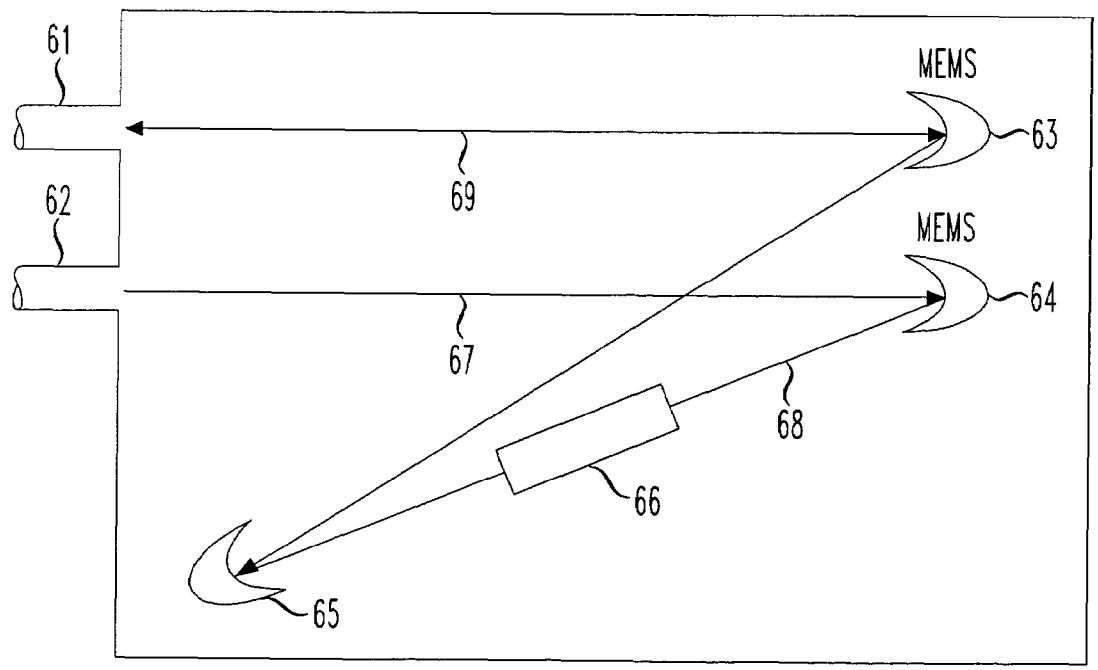
FIG. 6 is a block diagram of yet another embodiment of the present invention.

Referring to FIG. 6, there is shown another embodiment of the invention. FIG. 6 illustrates a package embodiment that uses MEMS mirrors 63, 64 and 65 in conjunction with other passive optical elements to modify light beams in various ways. Package 60 includes fibers 61 and 62, as well as MEMS mirrors 63, 64 and 65. This embodiment also includes a passive optical element 66 that is placed between MEMS mirrors 64 and 65. Passive optical element 66 may comprise a semiconductor optical amplifier, a fiber amplifier, or other suitable passive components.

As shown, fiber 62 provides a means to input a light beam into package 60. As will be understood by those skilled in the art, any active source of light may be used at the input to package 60 in place of fiber 62. For example, a laser diode may be directly coupled to the input port. Light beam 67 enters package 60 from fiber 62 (or any other appropriate source) and is directed toward MEMS mirror 64, which then reflects the light beam toward MEMS mirror 65 as beam 68. One or more passive devices 66 can be placed in the path of light beam 68 in order to modify the characteristics of light beam 68. For example, device 66 can be an amplifying fiber that increases the power of the propagating signal. After the beam passes through device 66, it will impinge and then reflect off of MEMS mirror 65. The reflected beam from MEMS mirror 65 then propagates toward MEMS mirror 63, where it is again reflected, this time toward output fiber 61 (or any other suitable output element). An advantage of this arrangement is that a highly integrated package incorporating wavelength control, optical amplification and/or modulation can easily be formed. The use of a set of three MEMS mirrors, in accordance with the present invention, allows for independent control of: (1) the alignment between input fiber 62 and the input of device 66 and (2) the alignment between the output of device 66 and output fiber 61.

While the present invention has been described with specificity, additional advantages and modifications will readily occur to those skilled in the art. Therefore, the present invention in its broader aspects is not limited to the specific details shown and described herein. Accordingly, various modifications may be made without departing from the spirit or scope of the general inventive concepts as defined by the claims appended hereto.

What is claimed is:

1. An arrangement for controlling the alignment direction of a light beam comprising:
   an active light source for emitting a beam of light;
   a passive receiver of light;
   a MEMS mirror for receiving said beam of light from said active source and for reflecting said beam of light toward said passive receiver of light wherein said MEMS mirror is electrically controlled to change its deflection profile until alignment is achieved between the active light source and the passive receiver of light;
   a monitoring photodiode disposed at a location separate from the passive receiver of light and coupled in a feedback path to the active light source; and
   a beam splitter associated with the MEMS mirror to enable said MEMS mirror to split the beam emitted from said active light source into a first beam and a second beam wherein said first beam is directed toward the passive receiver of light and said second beam is directed toward said monitoring photodiode, wherein a power measurement of said second beam is converted to an electrical signal by the monitoring photodiode and used to electrically change the deflection profile of said MEMS mirror.

2. The arrangement as defined in claim 1 wherein the beam splitter forms the first and second light beams to comprise a predetermined power ratio.

3. The arrangement as defined in claim 1 wherein the monitoring photodiode is operably connected to die active light source and to the MEMS mirror whereby a change in the strength of the first and second light beams causes the monitoring photodiode to generate the electrical signal used to change the deflection profile of the MEMS mirror.

4. The arrangement as defined in claim 1 wherein the active light source comprises a laser.

5. The arrangement as defined in claim 1 wherein the passive receiver of light comprises an optical fiber.

6. An arrangement for continuously controlling the amount of light propagating through a single passive optical receiver, the arrangement comprising
 a passive optical device for propagating optical signals in both a transmitting and a receiving direction;
 an active light source;
 an alignment monitoring photodiode disposed at a location separate from the passive optical device and coupled along a feedback signal path to the active light source;
 a first MEMS mirror and a second MEMS mirror, said first MEMS mirror disposed to reflect a beam of light from said active light source to said passive optical device and said second MEMS mirror disposed to reflect a beam of light from said passive optical device to said monitoring photodiode; and
 a control circuit disposed between the alignment monitoring photodiode and said first and second MEMS mirrors, said control circuit responding to changes in optical power received by said alignment monitoring photodiode and generating alignment correction signals to said first and second MEMS mirrors to modify the deflection profile of said first and second MEMS mirrors and provide optical realignment between the passive optical device and the active light source.

* * * * *